Feb. 21, 1950 W. J. ALBERSHEIM 2,498,059

MODULATION OF HIGH-FREQUENCY GENERATORS

Filed Dec. 11, 1947 3 Sheets-Sheet 1

INVENTOR
W. J. ALBERSHEIM
BY
Robert J. Fluskey
ATTORNEY

Feb. 21, 1950 W. J. ALBERSHEIM 2,498,059

MODULATION OF HIGH-FREQUENCY GENERATORS

Filed Dec. 11, 1947 3 Sheets-Sheet 2

INVENTOR
W. J. ALBERSHEIM
BY
Robert J. Guenther
ATTORNEY

Feb. 21, 1950 W. J. ALBERSHEIM 2,498,059

MODULATION OF HIGH-FREQUENCY GENERATORS

Filed Dec. 11, 1947 3 Sheets-Sheet 3

INVENTOR
W. J. ALBERSHEIM
BY
Robert J. Fluskey
ATTORNEY

Patented Feb. 21, 1950

2,498,059

UNITED STATES PATENT OFFICE 2,498,059

MODULATION OF HIGH-FREQUENCY GENERATORS

Walter J. Albersheim, Interlaken, N. J., assignor to Bell Telephone Laboratories, Incorporated, New York, N. Y., a corporation of New York Application December 11, 1947, Serial No. 791,069

2 Claims. (Cl. 332—52)

This invention relates to modulation apparatus and more particularly to the modulation of very high frequency oscillations.

With the trend of the art of radio communication toward higher and higher frequencies it has become necessary to modify the normal transmitter design involving the use of oscillator-buffer-amplifier arrangements because of vacuum tube limitations. In particular, since there is not commercially available at present any satisfactory amplifying means for use at the ultra-high frequencies, it has been considered necessary to use a high power oscillator directly coupled to the radiation means or antenna. A presently known means for generating high powered continuous waves at the ultra-high frequencies is the magnetron. However, magnetrons are very sensitive to variations in their operating conditions. Attempts to amplitude modulate a magnetron using conventional methods, such as by varying the supply potentials, results in a variation of the frequency as well. In addition, a magnetron operates most efficiently at one frequency, and its efficiency falls off rapidly if the frequency departs from that one frequency. To avoid instabilities due to variations of the supply potentials with the modulation, an absorption modulation system is generally used. This comprises the insertion of an absorber device, which is controlled by the modulating signals, between the oscillator and the antenna. This system has the objection that it does not present a constant impedance to the magnetron which results in the same kind of instability of operation and causes some frequency modulation to appear in the magnetron output, as well as the desired amplitude modulation.

An object of this invention is to provide means for modulating the output of a source of high frequency oscillations, such as a magnetron, in such a way that the impedance into which the high frequency source works is maintained constant.

One feature of this invention is that the high frequency source or oscillator is allowed to oscillate freely at the optimum frequency undisturbed by variations in impedance or voltage due to modulation. Another feature lies in the use of reactance tubes as modulators. An additional feature is the use of a quarter-wavelength line or an odd multiple thereof to obtain reactances which are varied reciprocally with the modulating signal. A further feature of the present invention is the use of tandem-connected resistance-reactance circuits to substantially eliminate undesired phase modulation. Still another feature is the use of either envelope feedback or predistortion of the signal input to correct non-linear distortion introduced by the modulating network. A further feature of the invention is in the use of resonant circuits to increase the reactance variation of a cavity reactance device.

In accordance with the invention, there is provided a modulation system which utilizes a constant amplitude, constant frequency source of high frequency oscillations, such as a magnetron, connected by means of a suitable transmission line, such as a coaxial cable, to a constant resistance modulating network comprising a plurality of paths, one path including a variable reactance device associated with a resistance, and another path including a similar variable reactance device associated through an impedance inverting means, specifically a quarter-wavelength line, with the effective resistance of an antenna. The variable reactances are so related to the resistances that, when the former are varied at modulation frequency under control of a suitable source, the impedance of the network connected across the high frequency source is maintained constant, and amplitude modulated high frequency oscillations are produced and transferred to the antenna.

In accordance with the invention, there is further provided a modulation system which produces amplitude modulated high frequency oscillations, while maintaining a constant impedance across the source of oscillations, which also substantially eliminates the phase modulation which may result with the system described above. This phase distortionless system utilizes two constant resistance modulating networks, similar to those of the previously described system, in tandem, with the reactance and resistance elements so interrelated that substantially phase distortionless amplitude modulated high frequency oscillations are produced and transferred to an antenna while maintaining constant the impedance of the network connected across the source of oscillations.

A more complete understanding of this invention, its objects, features and mode of operation, will be derived from the detailed description that follows, read with reference to the appended drawings, wherein.

Figure 1:
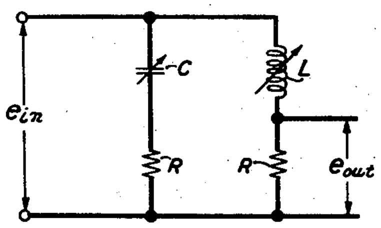
Fig. 1 shows the basic circuit of the constant resistance modulating network employed in the practice of the invention.
Figure 3:
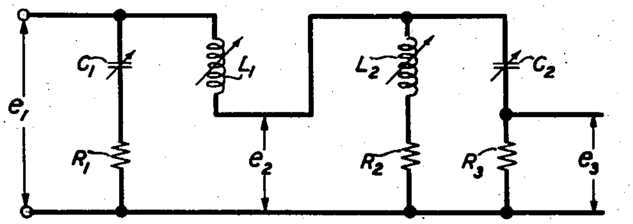
Figure 4:
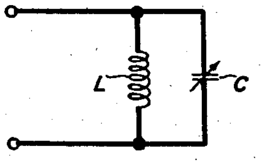
Figure 5:
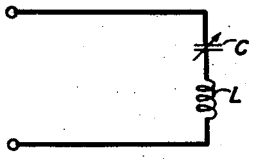
Figure 6A:
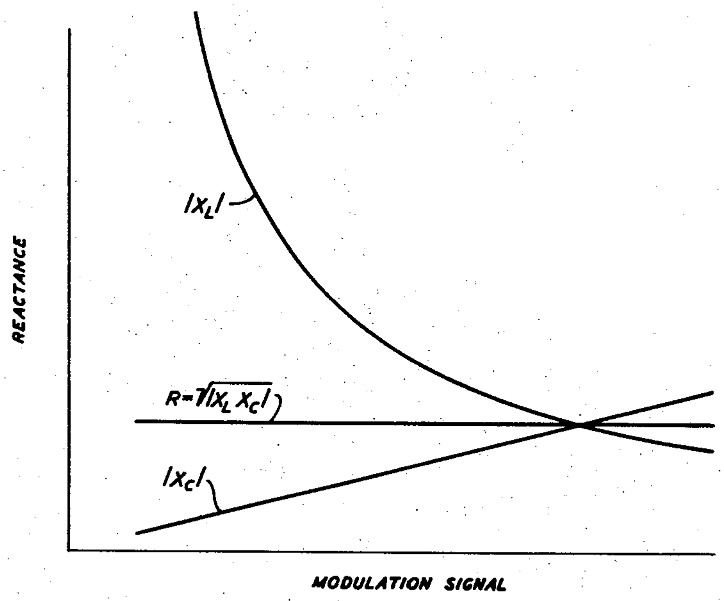

1 which exhibits the same constant resistance properties;

Fig. 3 shows the basic circuit for a phase distortionless modulation system comprising two of the networks of Fig. 1 connected in tandem;

Figs. 4 and 5 illustrate simple parallel and series circuit means for increasing the effective variation in admittance or reactance of a variable capacitance;

Fig. 6A illustrates graphically the reciprocal relation to be maintained between the capacitive and inductive reactances of the network shown in Fig. 1 in order to satisfy the relation $$R=\sqrt{|X_L X_C|}$$

Figure 6B:
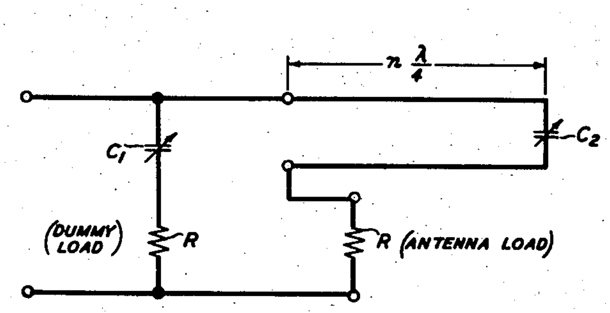
Figure 7:
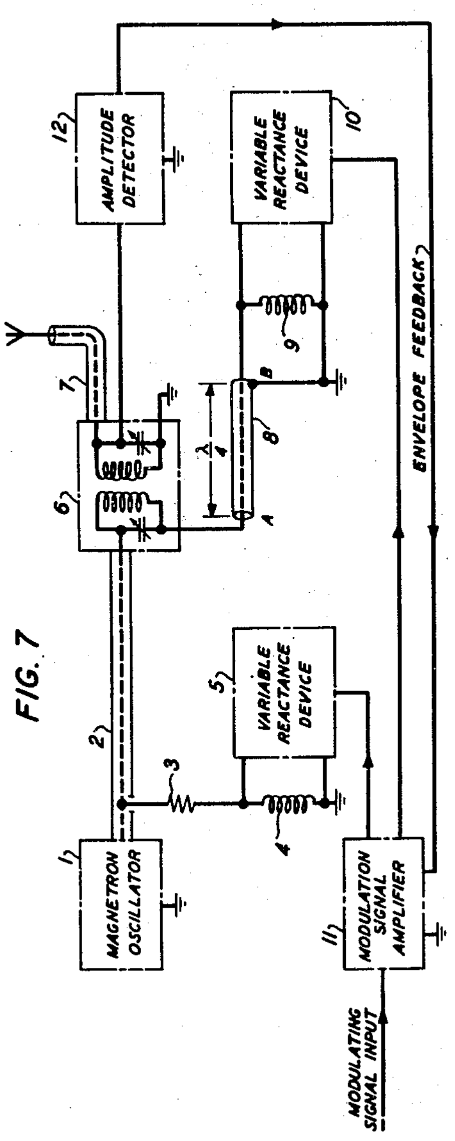
Figure 8:
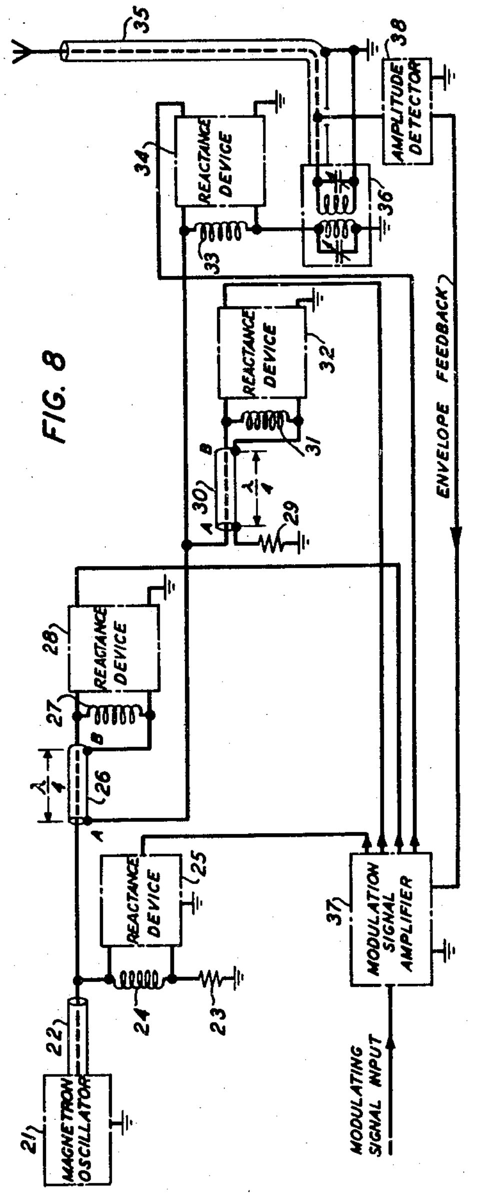

Fig. 6B illustrates the use, in a circuit equivalent to that of Fig. 1, of a quarter-wavelength line or odd multiple thereof to effectively invert a capacitive reactance to obtain an inductive reactance;

Fig. 7 illustrates a modulation system incorporating a constant resistance modulating network in accordance with the invention; and Fig. 8 illustrates the use of tandem-connected constant resistance modulating networks, in accordance with the invention, in a modulation system for accomplishing substantially phase distortionless amplitude modulation.

The invention herein disclosed involves the application of a constant resistance network in a novel way to amplitude modulate a magnetron. The constant resistance circuit used is shown in elementary or basic form in Fig. 1, and comprises a pair of resistances R, R, a variable capacitance C and a variable inductance L. It may be shown that in such a network, the input impedance presented to the input $e_{in}$ at all frequencies is a constant resistance equal to the value of R as long as the values of L and C are related by the following equation:

$$R=\sqrt{\frac{L}{C}} \qquad (1)$$

Figure 2:
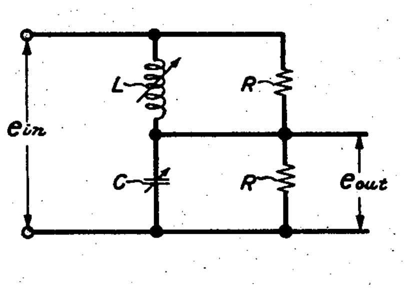
Fig. 2 shows a modification of the circuit of Fig.

By varying the values of C and L at the modulation frequency in a complementary way so that the relationship (1) is maintained, it is possible to keep the input impedance constant and at the same time to obtain amplitude modulation of a carrier wave $e_{in}$ applied to the network. An amplitude modulated voltage $e_{out}$ appears across one of the resistances R, and an inversely modulated voltage appears across the other resistance R. Fig. 2 is an equivalent network exhibiting the same properties.

As will be brought out in greater detail hereinafter, in a modulation circuit arrangement in accordance with the invention, one of the resistances R corresponds to a radiating antenna suitably coupled so as to present a practically constant resistance over the band, the other resistance R corresponds to a dummy load, and the reactances L and C would be provided by known types of reactance tubes or cavity resonators controlled in accordance with the modulating signal in a known manner.

The arrangement shown in Fig. 1 provides the desired amplitude modulation but in addition it also introduces some undesirable phase modulation as may be seen from the equations:

$$e_{out}=\frac{e_{in}}{1+\frac{j\omega L}{R}} \qquad (2)$$

since $$R^2=\frac{L}{C},\ L=R^2C$$

$$\therefore e_{out}=\frac{e_{in}}{1+j\omega CR}=\frac{e_{in}(1-j\omega CR)}{1+\omega^2C^2R^2} \qquad (3)$$

The phase angle is therefore:

$$\Phi=\tan^{-1}(-j\omega CR) \qquad (4)$$

Since C is varied at modulation frequency, phase modulation is produced.

Fig. 3 shows an arrangement for substantially eliminating such phase modulation. This is accomplished by connecting two constant resistance networks in tandem. That the phase modulation is eliminated is shown by the following equations:

Let $$R_1=R_2=R_3=R \qquad (5)$$

$$\frac{L_1}{C_1}=\frac{L_2}{C_2}=R^2 \qquad (6)$$

Then the input impedance is a constant=R.

$$e_2=\frac{e_1}{1+j\omega C_1R} \qquad (7)$$

$$e_3=\frac{e_2}{1+\frac{R}{j\omega L_2}}=\frac{e_1}{(1+j\omega C_1R)\left(1+\frac{R}{j\omega L_2}\right)} \qquad (8)$$

$$\frac{e_1}{e_3}=1+\frac{R^2C_1}{L_2}+jR\left(C_1\omega-\frac{1}{L_2\omega}\right) \qquad (9)$$

The condition of zero phase angle prevails when there is no $j$ term.

∴ setting the $j$ term equal to zero:

$$C_1\omega=\frac{1}{L_2\omega}$$

$$L_2=\frac{1}{C_1\omega^2} \qquad (10)$$

Since the oscillator frequency and, hence, $\omega$ is constant, relation 10 may be readily satisfied, and as long as the conditions imposed by relations 5, 6 and 10 are maintained, there is no phase modulation present in the amplitude modulated output.

If it is found that the variation in reactance available from the reactance device is too small to produce the desired percentage of modulation, each reactance element may be built out into a parallel (Fig. 4) or series (Fig. 5) combination of both a capacitance and an inductance and thereby increase the reactance variation obtainable. In Fig. 4, the effective percentage change of admittance is increased in accordance with the following relations:

Admittance of capacitance alone is:

$$Y=j\omega C$$

The relative change in admittance is:

$$\frac{dY}{Y}=\frac{dC}{C} \qquad (11)$$

Admittance of shunt network is:

$$Y=j\omega C+\frac{1}{j\omega L}$$

The relative change in admittance is given by:

$$\frac{dY}{Y}=\frac{j\omega dC}{j\omega C+\frac{1}{j\omega L}}=\frac{dC}{C-\frac{1}{\omega^2L}};\ \text{this is} > \frac{dC}{C} \qquad (12)$$

It is evident therefore that the admittance change is greater in the shunt network (Equation 12) than with the capacitance alone (Equation 11).

In Fig. 5, the effective percentage change of reactance is increased in accordance with the following relations:

Reactance of capacitance alone is:

$$X_c=\frac{1}{j\omega C}$$

The relative change in reactance is:

$$\frac{dX_c}{X_c}=\frac{j\omega C(-j\omega dC)}{(j\omega C)^2}=-\frac{dC}{C} \quad (13)$$

Reactance of series network is:

$$X=\frac{1}{j\omega C}+j\omega L$$

The relative change in reactance is:

$$\frac{dX}{X}=-\frac{dC}{C(1-\omega^2LC)} \quad (14)$$

It can be seen therefore that the reactance change is greater in the series network (Equation 14) than with the capacitance alone (Equation 13). While Figs. 4 and 5 each show a variable capacitive reactance C associated with a fixed or selected magnitude of tuning inductance L, the same effects may be obtained with a variable inductive reactance and a fixed or selected magnitude of tuning capacitance.

In accordance with the invention, one of the required variable reactances is capacitive while the other reactance is inductive and the two must be varied simultaneously and reciprocally. Figure 6A illustrates this graphically. If $|X_C|$ is varied with the modulating signal linearly as shown by the straight line, $|X_L|$ must be varied reciprocally and non-linearly in order that $R=\sqrt{|X_LX_C|}$ shall remain constant. This is difficult to achieve, but by utilizing the fact that a reactance X placed in the end of a transmission line with an iterative resistance R and a length equal to one-quarter wavelength, or an odd multiple $n$ of one-quarter wavelength, produces an input impedance equal to $$\frac{R^2}{X}$$

the required reciprocal action may be obtained, as illustrated by Fig. 6B wherein the capacitance $C_2$ provides the reactance X. Since the line inverts the impedance provided by capacitance $C_2$, the input impedance is a constant equal to R, if $C_2$ equals $C_1$. This may be shown by starting with the original criteria for constant resistance as given by Equation 1;

$$R=\sqrt{\frac{L}{C}}$$

or $$R^2=\frac{L}{C}=\frac{\omega L}{\omega C} \quad (15)$$

Since the one-quarter wavelength line inverts the impedance $X_{C_2}$, an impedance $$\frac{R^2}{X_{C_2}}$$

appears across the transmission line input terminals; but, $$\frac{R^2}{X_{C_2}}=R^2\omega C_2$$

and this is in the form of an inductive reactance.

Substituting $R^2C_2$ for L, it is evident that the criteria given by (15) is met, since $$R^2=\frac{R^2\omega C_2}{\omega C_1}$$

when $$\omega C_2=\omega C_1$$

Fig. 6B shows a variable capacitive reactance $C_2$ connected at one end of a quarter-wavelength line to invert its impedance, while the variable capacitive reactance $C_1$ is used directly. Obviously, these reactances could both be replaced by reactances of opposite sign. That is, $C_1$ and $C_2$ could each be replaced with variable inductive reactances. This would result in an effective capacitive variable reactance at the input end of the quarter-wavelength line and a directly used inductive reactance in the position of $C_1$. The requirements of the invention could still be met with this inversion in a satisfactory manner.

The relation $$R^2=\frac{L}{C}$$

may be satisfied in a variety of ways, that is, L and C may be selected so that with no modulation, the current divides equally in the two branches of the constant resistance network. When adjusted in this way, there will be a voltage of $$\frac{E}{\sqrt{2}}$$

where E is the oscillator voltage, across the dummy load and across the antenna resistance. Therefore, for no modulation there will be one-half of the available power in the antenna. Under this condition, the maximum attainable modulation is limited to 41.4 per cent. If it is desired to obtain modulation percentages approaching 100 per cent, it is necessary to choose L and C so that $$\frac{E}{2}$$

appears across the antenna resistance. This means that the power in the antenna for no modulation is reduced to 25 per cent of the available power. However, to modulate 100 per cent, the reactance in series with the antenna resistance must be varied from zero to infinity. This is difficult to achieve with practical variable reactance devices alone; but by building out said reactance variation devices into parallel or series resonance combinations, it is possible, as described above with reference to Figs. 4 and 5, to increase the relative variations in reactance and in this manner approach closely 100 per cent modulation. The system described herein is therefore flexible and may be adjusted, as required for the specific application at hand, to provide a large degree of modulation at low carrier powers, or to provide large carrier powers with a small degree of modulation.

In this hereinbefore described method of modulation, distortion may result because of the non-linearity of a series circuit involving a reactance and a resistance. That is, doubling the reactance does not halve the current through the series combination of the resistance and reactance since the total change in impedance of the series combination is not proportional to the change in the reactance alone. This distortion may be substantially reduced by employing negative envelope feedback, that is, by demodulating some of the modulated output, and feeding back and combining the demodulated output with the modulating input signal.

In order that the practical application of my invention may be more clearly understood, a specific embodiment is shown in Fig. 7, and will now be described.

A magnetron oscillator 1 is coupled by coaxial line 2 to a constant resistance modulating network of the type described, comprising resistor 3 in series with inductance 4 shunted by variable reactance device 5 to ground, all in shunt with the antenna coupling network 6, which couples the antenna 7 to the modulating network, in series with the reactive impedance presented at end A of the quarter-wavelength line 8 resulting from the inductance 9 shunted by variable reactance device 10 connected at end B of the quarter-wave line 8 to ground. The variable reactance devices 5 and 10 may be any reactance device designed for operation at the frequency used and capable of being varied at the modulation frequency. Examples of suitable variable reactance devices are shown in United States patent to Hansell 2,121,737 dated June 21, 1938, and in "Automatic Tuning" by D. E. Foster and S. W. Seeley, 25 I. R. E. Proc. 289, 306, Fig. 12 (March 1937). In addition, variable reactance cavity-resonators using the principles described in "A 1-Kilowatt Frequency-Modulated Magnetron for 900 Megacycles" by J. S. Donal, Jr., et al., 35 I. R. E. Proc. 664 (July 1947) would also be suitable. The modulation amplifier 11 may be of conventional design including means for impressing in-phase modulating voltages on the two variable reactance devices.

The method of operation is as follows. High frequency oscillations are produced by magnetron 1 and the energy is conducted by coaxial line 2 to the constant resistance modulating network comprising elements 3, 4, 5, 6, 8, 9 and 10. Resistor 3 is a dummy load and is selected to have a resistance equal to the antenna resistance coupled by coupling network 6. Tuning inductance 4 is adjusted so that in combination with reactance 5 anti-resonance occurs at a frequency slightly below the oscillator frequency. This will result in a net capacitive reactance whose magnitude may be varied over a wide range with but small variations of the variable reactance 5. This net capacitive reactance together with the net inductive reactance which is presented at end A of the quarter-wavelength line 8 are the C and L which are chosen to satisfy the relation $$R^2=\frac{L}{C}$$

as described above. The net inductive reactance which appears at end A of the line 8 is due to a net capacitive reactance connected at end B. This net capacitive reactance is obtained, as in the case of reactances 4 and 5, by adjusting tuning inductance 9 so that in combination with reactance 10, antiresonance occurs at a frequency slightly below the oscillator frequency. There is therefore connected to end B of line 8 a net capacitive reactance whose magnitude may be varied over a wide range with only small variations of the variable reactance 10. This net capacitive reactance connected to end B of line 8 is inverted by the line 8 and produces a net inductive reactance at end A. In this way, it is possible by means of modulation amplifier 11 to vary both of the variable reactance devices 5 and 10 at the modulation frequency, and in the same phase, and obtain a variable net inductive reactance and a variable net capacitive reactance whose ratio is kept constant and equal to $R^2$, whereby the condition for constant impedance is met.

In the above description and as shown in Fig. 7, the variable reactance devices 5 and 10 are indicated as capacitive and are associated with tuning inductances 4 and 9. The circuit would function in accordance with the invention, if the variable reactance devices were inductive rather than capacitive and the associated tuning inductances were capacitances. Obviously, many combinations are possible and the present invention is applicable regardless of the particular combination used providing that the combinations produce a variable reactance of one sign in one branch of the circuit and a variable reactance of opposite sign in the other branch of the circuit.

By adjusting the magnitudes of the reactances, the average power delivered to the antenna along with the maximum modulation capability may be chosen at will as described above.

Since the net reactance of both branches of the constant resistance circuit are varied at the modulation frequency, the oscillator current in each branch is made to vary at the modulation frequency. The oscillator current flows through the dummy load 3 in one branch; and in the other branch it flows through the antenna resistance coupled in series with the reactance appearing at end A of line 8 by the antenna coupling network 6. Therefore, these oscillator currents which are varying in magnitude at the modulating frequency, used to control the variable reactance devices 5 and 10, will develop voltages of oscillator frequency which are amplitude modulated across the dummy load 3 and the coupled antenna resistance. The coupling network 6 transfers this modulated energy to the antenna 7. In this manner, therefore, amplitude modulation of the oscillator carrier frequency is obtained without varying the impedance into which the oscillator works. The amplitude detector 12 connected between the antenna and the modulation amplifier 11 serves the purpose of providing envelope feedback whereby distortion present in this arrangement may be reduced. This feedback is connected in phase opposition to the modulating signal.

The system described in Fig. 7 introduces some phase distortion since the current in any one of the branches, not only varies in magnitude at the frequency of the modulation but also varies in phase because the ratio of the reactance to resistance is changed since the reactance is varied whereas the resistance is substantially constant. The coupled resistance is maintained substantially constant over the band of frequencies used by means of the antenna coupling network 6. Because this phase variation may be objectionable, means have been developed to substantially eliminate it as described in principle with reference to Fig. 3, and in a specific embodiment in Fig. 8 now to be described.

Magnetron oscillator 21 supplies high frequency energy over a coaxial line 22 to the constant resistance modulation network. This network comprises resistance 23 in series with the net capacitive reactance of the parallel combination of inductance 24 and reactance device 25, all in parallel with the inductive reactance appearing at end A of quarter-wavelength line 26, as a result of the net capacitive reactance of the parallel combination of inductance 27 and reactance device 28 which are connected at end B of line 26, in series with an effective constant resistance connected between end A of line 26 and ground.

This effective constant resistance is obtained from a second constant resistance network connected between end A of line 26 and ground and comprising resistance 29 in series with the inductive reactance appearing at end A of quarter-wavelength line 30 as a result of the net capacitive reactance of the parallel combination of inductance 31 and reactance device 32 which are connected to end B of line 30, all in parallel with the net capacitive reactance of the parallel combination of inductance 33 and reactance device 34, in series with the resistance coupled from the antenna 35 by means of antenna coupling network 36. Thus it is evident that Fig. 8 shows two constant resistance modulating networks connected in tandem. Inductances 24, 27, 31 and 33 are each adjusted to resonate with the associated reactance devices 25, 28, 32 and 34 at a frequency slightly below the oscillator frequency. This will provide net capacitive reactances whose magnitudes may be varied over a wide range with small variations in the reactance of the variable reactance devices in each parallel combination, which in the case of the parallel combinations of elements 27 and 28 and elements 31 and 32 are inverted by quarter-wavelength lines to produce variable inductive reactances. The two net capacitive reactances are adjusted with respect to the two inverted variable reactances to satisfy the relation $$\frac{L}{C}=R^2$$

in each of the two tandem-connected networks. All of the variable reactances are varied at the modulating frequency and in the same phase by means of the amplifier 37, keeping the ratio $$\frac{L}{C}$$

constant and equal to $R^2$ in each of the two tandem-connected networks. The phase correction is achieved in this manner: The voltage applied to the second tandem-connected network has an inductive phase characteristic since the second network is connected in series with the inductive reactance appearing across end A of line 26. In the second tandem-connected network, the antenna coupling unit is connected in series with a net capacitive reactance resulting from inductance 33 and reactance device 34 in parallel. As a result, the voltage developed across the antenna coupling network has a capacitive phase characteristic with respect to the voltage applied to the second network and therefore the phase displacement is compensated and the net phase may be made equal to zero, as was described above in connection with Fig. 3. This result may be accomplished without any greater loss of power than that which obtains with the single network system by selecting the magnitudes of the reactances of each network so that the voltage which appears at the output of each network, with no modulation, is equal to the voltage applied to each network divided by $\sqrt{2}$. If then, E is the oscillator voltage, $$\frac{E}{\sqrt{2}}$$

appears across the output of the first network which is applied to the input of the second network and the output of the second network is $$\frac{E}{\sqrt{2}}\times\frac{1}{\sqrt{2}}=\frac{E}{2}$$

Since the total voltage E is twice the unmodulated value, 100 per cent modulation is readily attained. The power dissipated in the first network under these conditions is $$\frac{E^2}{2R}$$

and the power dissipated in the second network is $$\frac{E^2}{4R}$$

which leaves an output power of $$\frac{E^2}{4R}$$

or 25 per cent. This is the same power output which is attained with the single network system at 100 per cent modulation.

There is produced therefore an amplitude modulated carrier wave which is free of phase distortion and this is coupled to the antenna through the antenna coupling network 36. The amplitude detector 38 connected between the antenna and the amplifier 37 is for the purpose of correcting, through the use of envelope feedback, the distortion that may be inherent in the system.

It will be understood that although the specific embodiments of the invention shown herein illustrate the use of a magnetron as a source of the high frequency oscillations, the invention is equally applicable to systems using devices other than magnetrons and that the invention is not limited to a transmitter system such as shown, but that it may be applied to any system where a constant impedance modulator is required. Further, it will be understood that the net reactances may be obtained by utilizing variable capacitive reactance devices associated with fixed inductances or variable inductive reactance devices associated with fixed capacitances. Any of these combinations may in turn be associated with a quarter-wavelength line to obtain the desired impedance inversion.

What is claimed is:

1. Apparatus for supplying to a resistance load, phase distortionless amplitude modulated high frequency oscillations derived from a constant amplitude constant frequency source, without altering the impedance presented to said source, which comprises a first series combination of a first resistance element in series with a first variable reactance of given sign connected across said source, a second series combination of a second resistance element in series with a second variable reactance of sign opposite said given sign and a third variable reactance of sign opposite said given sign, said first and second series combinations being connected in parallel, and a third series combination comprising said load as a third resistance element in series with a fourth variable reactance element of given sign, said third series combination being connected in parallel with the series connected second resistance element and second variable reactance, and means for varying the two reactance elements of given sign simultaneously with reciprocal variations of the two reactances of sign opposite said given sign in a preassigned manner under control of a modulating signal, whereby the impedance presented to said source is maintained constant and the said modulated oscillations delivered to said load are free of phase distortion.

2. Apparatus in accordance with claim 1 in which each of said second and third variable reactances of sign opposite said given sign is provided by a quarter-wavelength line and the parallel combination of a reactance of any sign and a device which provides a variable reactance having a sign opposite that of said last mentioned reactance, and in which each of the said two variable reactances of given sign is provided by the parallel combination of a reactance of any sign and a device which provides a variable reactance of sign opposite to that of the reactance with which the device is in parallel.

WALTER J. ALBERSHEIM.

REFERENCES CITED

The following references are of record in the file of this patent:

UNITED STATES PATENTS

| Number | Name | Date |
|---|---|---|
| 2,111,743 | Blumlein et al. | Mar. 22, 1938 |
| 2,191,315 | Guanella | Feb. 20, 1940 |
| 2,274,347 | Rust et al. | Feb. 24, 1942 |
| 2,295,351 | Luck | Sept. 8, 1942 |
| 2,430,126 | Korman | Nov. 4, 1947 |